United States Patent [19]
Kojima

[11] Patent Number: 5,722,894
[45] Date of Patent: Mar. 3, 1998

[54] TORQUE CONTROLLER

[75] Inventor: Masayuki Kojima, Wakayama, Japan

[73] Assignee: Noritsu Koki Co., Ltd., Wakayama, Japan

[21] Appl. No.: 583,609

[22] Filed: Jan. 5, 1996

[30] Foreign Application Priority Data

Jan. 26, 1995 [JP] Japan .................. 7-010863

[51] Int. Cl.⁶ .................................. F16D 7/10
[52] U.S. Cl. ........................... 464/37; 192/56.1
[58] Field of Search ........ 464/35, 37; 192/56.1, 192/55.1

[56] References Cited

U.S. PATENT DOCUMENTS

| | | | |
|---|---|---|---|
| 2,854,831 | 10/1958 | Rothweiler | 464/35 |
| 2,860,498 | 11/1958 | Crossley | 464/35 |
| 2,882,704 | 4/1959 | Quackenbush | 464/35 |
| 3,226,951 | 1/1966 | De Mallie et al. | 464/35 |
| 3,296,888 | 1/1967 | Schweitzer | 464/35 X |
| 3,487,902 | 1/1970 | Persson et al. | 464/35 X |
| 3,877,253 | 4/1975 | Yeagle | 464/35 |
| 3,979,925 | 9/1976 | Kato | 464/35 |
| 4,610,340 | 9/1986 | Helmes et al. | 464/35 X |

*Primary Examiner*—Rodney H. Bonck
*Attorney, Agent, or Firm*—Wenderoth, Lind & Ponack

[57] ABSTRACT

A transmission device has holding slots provided in a boss portion thereof for holding engaging elements. A drive shaft has engaging recesses provided in an outer surface thereof for accepting partially the engaging elements to engage the transmission device with the drive shaft. The engaging elements remain urged against the engaging recesses of the drive shaft by a resilient member which is disposed radially of a boss portion of the transmission device for maintaining the engagement of the transmission device with the drive shaft. When the transmission device is overloaded, the engaging elements depart from the engaging recesses in the drive shaft, against the urging force of the resilient member, to cancel the transmission of torque from the drive shaft to the transmission device.

3 Claims, 4 Drawing Sheets

TORQUE CONTROLLER

BACKGROUND OF THE INVENTION

The present invention relates to an improvement of a torque controller.

A conventional torque controller comprises, as shown in FIG. 8, a pair of retaining members 8D mounted to both ends of a rotary boss 8C joined to a drive shaft 8B of a Motor 8A, a transmission device 8E, e.g. a toothed wheel, and two friction plates 8F which are rotatably fitted onto the rotary boss 8C, and a compression coil spring 8G mounted between one of the retaining members 8D and the friction plate 8F for urging the transmission device 8E and the two friction plates 8F against the other retaining member 8D. The transmission device 8E is hence engaged by the friction effect of the two friction plates 8F to the rotary boss 8C.

During operation, torque is transmitted from the drive shaft 8B to the transmission device 8E by the effect of friction. If the transmission device 8E is overloaded, the friction effect is canceled, thus terminating the transmission of the torque.

It is however essential for producing a desired strength of friction in the conventional torque controller to optimize the contact area between the transmission device 8E and each of the friction plates 8F. As a result, the overall dimensions of the controller will be increased. In addition, it is known that the transmission of torque through friction is substantially affected by environmental conditions. Also, the major components of the conventional torque controller are installed in alignment axially of the drive shaft 8B, thus increasing the lengthwise dimension.

It is an object of the present invention, in view of the foregoing predicaments, to provide an improved torque controller which is of smaller dimensions, particularly in length, and which is less affected by environmental conditions during transmission of torque.

SUMMARY OF THE INVENTION

A torque controller according to the present invention has a transmission device provided with a center hole into which a drive shaft of a power source is inserted, and engaging means for engaging the transmission device with the drive shaft. When the transmission device is overloaded thus to produce a counter torque on the drive shaft, the transmission device is automatically disengaged from the drive shaft. In particular, the transmission device has holding slots provided in a boss portion thereof for holding the engaging means, the drive shaft has engaging recesses provided in an outer surface thereof for accepting partially the engaging means to engage the transmission device with the drive shaft. The engaging means remain urged against the engaging recesses of the drive shaft by a resilient member which is disposed radially of the boss portion of the transmission device for maintaining the engagement of the transmission device with the drive shaft. During operation, when the transmission device is overloaded, the engaging means depart from the engaging recesses in the drive shaft, against the urging force of the resilient member, to cancel the transmission of torque from the drive shaft to the transmission device.

The torque controller of the present invention allows the transmission device to remain engaged with the drive shaft when it is loaded normally in a common transmission mode with the engaging means being urged by the resilient member towards the engaging recesses of the drive shaft. During the common transmission mode, the drive shaft can transmit torque to the transmission device.

If the transmission device is overloaded to thus produce a counter torque on the drive shaft, the engaging means depart from their respective engaging recesses of the drive shaft against the urging force of the resilient member. As a result, the torque transmission from the drive shaft to the transmission device is interrupted.

DETAILED DESCRIPTION OF THE PREFERRED EMBODIMENTS

Embodiment 1

Figure 1:
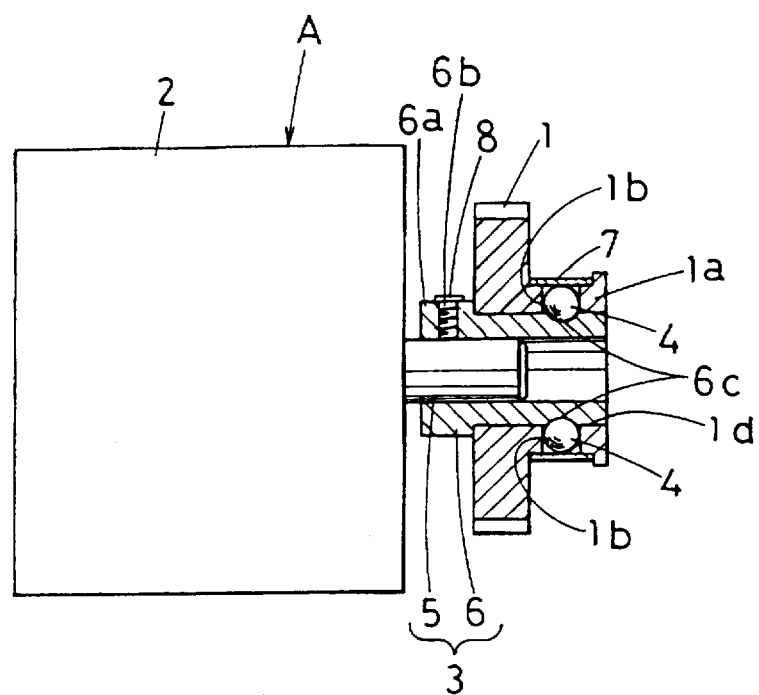
FIG. 1 is a cross sectional front view of a torque controller showing Embodiment 1 of the present invention.
Figure 2:
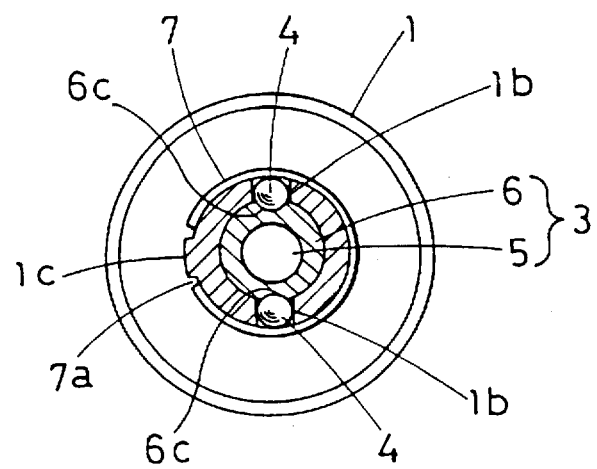
FIG. 2 is a side view of the same.
Figure 3:
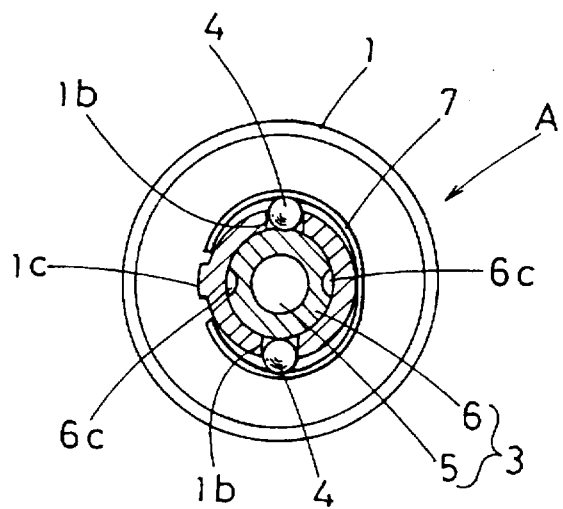
FIG. 3 is an explanatory view of operations of the same.

A torque controller A shown in FIGS. 1–4 has a gear (an example of a transmission device) connected by a ball 4 (an example of an engaging means) to a drive shaft 3 of a motor 2 (an example of a driving source). When the drive shaft 3 is stressed by a large torque due to overloading on the gear 1, engagement with the gear 1 is released to terminate torque transmission.

The drive shaft 3 comprises a motor shaft 5 of the motor 2 and a rotary boss 6. The rotary boss 6 is coaxially fitted onto the motor shaft 5. The rotary boss 6 has a threaded hole 6b provided through a radially enlarged proximal portion 6a thereof. The rotary boss 6 is tightened onto the motor shaft 5 by a screw screwed into the threaded hole 6b. Also, the rotary boss 6 has provided in the outer surface of a distal end thereof a pair of ball recesses 6c for accepting balls 4. The two ball recesses 6c are equally spaced from each other, e.g. at opposite sides of the rotary boss 6.

The gear 1 has provided in a boss portion 1a thereof a pair of ball slots 1b for accommodating the balls 4. The two ball slots 1b are also equally spaced from each other, e.g. at opposite sides of the boss portion 1a. A projection 1c is arranged on the outer surface of the boss portion 1a of the gear 1 between the two ball slots 1b for preventing a resilient ring 7 from slipping. The gear 1 has therein a center hole 1d into which the rotary boss 6 of the drive shaft 3 is rotatably inserted.

The resilient ring 7 (an example of a resilient member) has therein a slit formed, e.g., by rolling a strip of a resilient material. The resilient ring 7 is fitted onto the boss portion 1a of the gear 1 to cover the ball slots 1b. The resilient ring 7 is restricted at its two ends by the projection 1c of the base portion 1a.

The balls 4 accommodated in the ball slots 1b in the gear 1 are seated sectionally in their respective ball recesses 6c of the rotary boss 6. Also, the balls 4 remain urged towards the ball recesses 6c by the resilient ring 7 so that the gear 1 is engaged with the rotary boss 6.

3

While the gear 1 is loaded normally, the urging force of the resilient ring 7 allows the balls 4 to stay in their respective ball recesses 6c for transmission of torque. If the transmission device is overloaded, the balls 4 are caused to depart outwardly from the ball recesses 6c of the rotary boss 6 against the urging force of the resilient ring 7. More specifically, the torque controller of this embodiment maintains the engagement between the gear 1 and the drive shaft 3 by the urging force of the resilient ring 7 during normal operation of the gear 1 and transmits torque from the drive shaft through the balls 4 to the gear 1. When the gear 1 is overloaded and an excessive counter torque is generated on the drive shaft 3, the balls 4 are released from their respective ball recesses 6c at the drive shaft 3 side, thus disengaging the gear 1 from the drive shaft 3 and terminating the transmission of torque.

Figure 4:
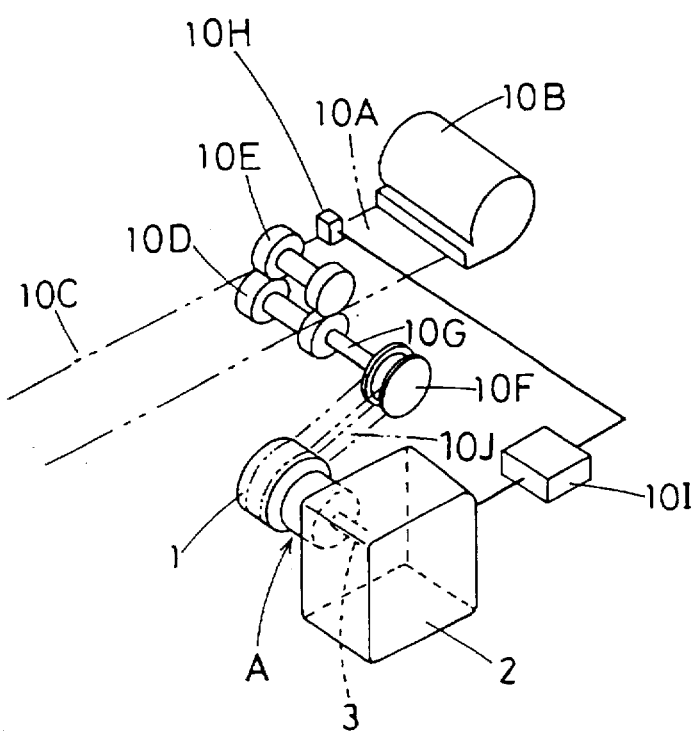
FIG. 4 is a perspective view showing a film conveying unit equipped with the torque controller in a photographic printing machine.

FIG. 4 illustrates the torque controller A installed for use in a film conveying unit of a photographic printing machine. It should be noted that the transmission device is not a gear but a pulley 1. The torque controller A is employed to prevent a film 2 from being injured by rollers.

The film conveying unit is designed for conveying a (negative) film 10A from its cartridge 10B through a transfer path 10C to an exposure station of the photographic printing machine. After the exposure process is completed, the film 10A is returned back to the cartridge 10B. More particularly, the film 10A is rewound on a spool (not shown) of the cartridge 10B with its proximal end joined to the spool. The film 10A is conveyed by a conveying means which comprises drive rollers 10D and press rollers 10E arranged on opposite sides of the transfer path 10C. The drive rollers 10D are driven by a motor 2. A belt 10J is spanned between the main pulley 1 mounted on a drive shaft 3 of the motor 2 and an idler pulley 10F fixedly mounted on a roller shaft 10G of the drive rollers 10D. As the drive shaft 3 of the motor 2 runs, the drive rollers 10D are rotated. The press rollers 10E remain urged by holding means (not shown) such as springs towards the drive rollers 10D. As the drive rollers 10D rotate, the press rollers 10E follow to run directly on the film 10A which is thus conveyed along the transfer path 10C. There is also a detecting means 10H disposed between the conveying means and the cartridge 10B for reading end perforations (not shown) provided in the film 10A. The end perforations may be read by the detecting means 10H slightly before or after the film 10A is entirely unloaded from the cartridge 10B. The movement of the drive rollers 10D is controlled by a roller controller means 101 which is responsive to a detection signal from the detecting means 10H.

The operation in the film conveying unit equipped with the torque controller A now will be explained.

(1) The film 10A is first unloaded from the cartridge 10B and conveyed by the conveying means to the exposure station for exposure process.

(2) If the film 10A continuously runs with its final frame at the exposure station, its perforations are read by the detecting means 10H which in turn sends a detection signal to the roller controller means 101. Upon receiving the detection signal, the roller controller means 101 stops the rotation of the drive shaft 3 of the motor 2 and thus the movement of the drive rollers 10D.

(3) In case that the roller controller means 101 fails to stop the motor 2 due to control error or no response to the detection signal from the detecting means 10H, the torque controller A is activated to prevent the film 10A from being damaged by the continuous movement of the drive rollers 10D. In other words, when the film 10A has been fully unloaded from the cartridge 10B and no longer is conveyed, the pulley 1 is automatically disengaged from the drive shaft 3 and made free from a torque transmitted from the drive shaft. This prevents the film A from being stressed by an excessive tension and separated from its cartridge 10B or injured by the rollers 10D and 10E.

(4) After the film 10A is fully unloaded from the cartridge 10B, it is returned back to the same by the reverse movement of the drive rollers 10D.

It is understood that the torque controller A of this embodiment is not limited to use in the film conveying means in a photographic printing machine.

Embodiment 2

Figure 5:
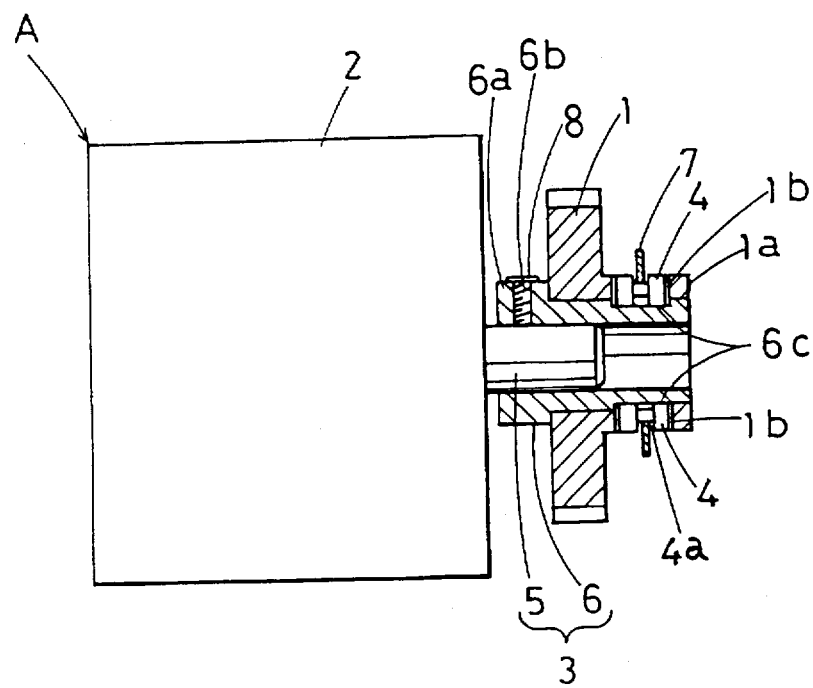
FIG. 5 is a cross sectional front view of a torque controller showing Embodiment 2 of the present invention.
Figure 6:
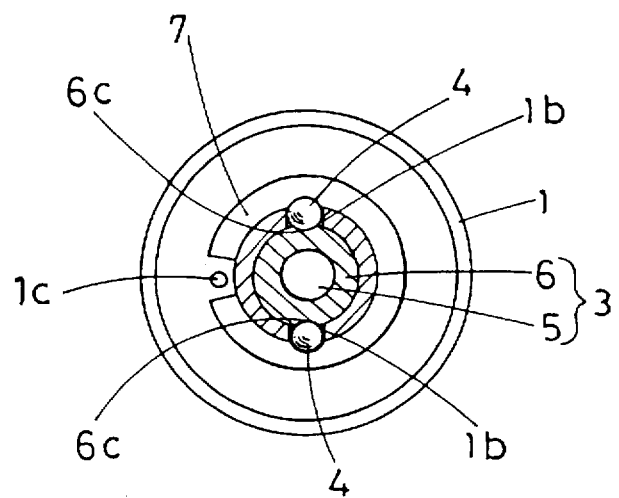
FIG. 6 is a side view of the same.
Figure 7:
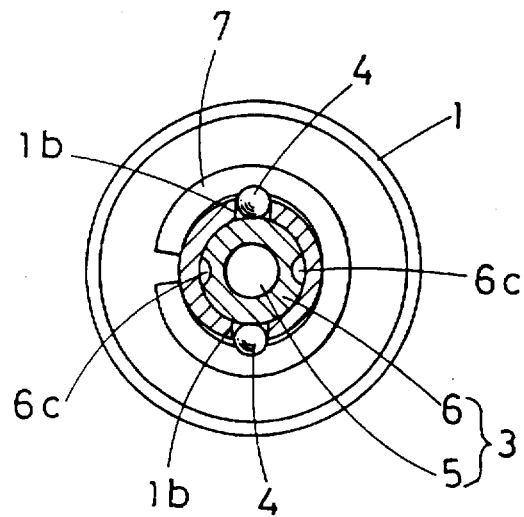
FIG. 7 is an explanatory view of operations of the same.
Figure 8:
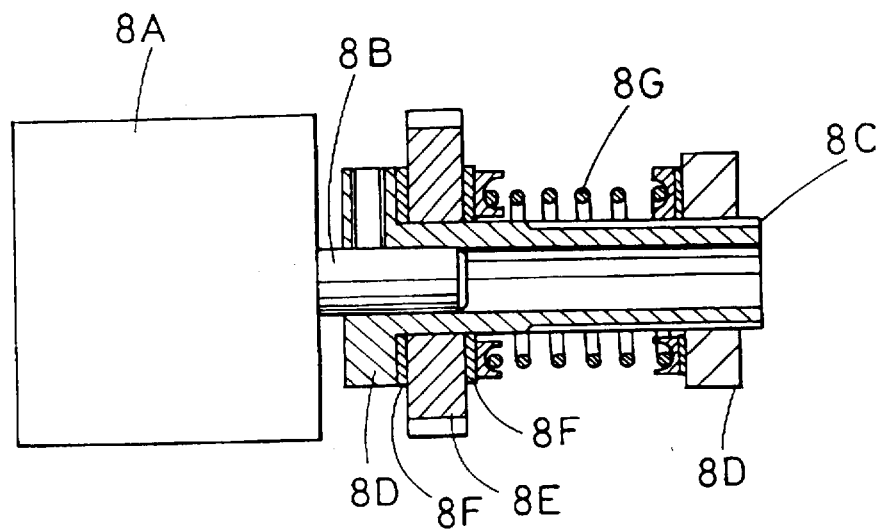
FIG. 8 is a cross sectional front view of a conventional torque controller.

FIGS. 5 to 7 show a torque controller of Embodiment 2 of the present invention.

The torque controller A of this embodiment is similar to that of Embodiment 1, in which a gear 1 is engaged by engaging means 4 with a drive shaft 3 of a motor 2. When the gear 1 is overloaded, it is disengaged from the drive shaft 3 of the motor 2 to terminate the transmission of torque.

In particular, the engaging means 4 are specifically pin-shaped members extending axially parallel to the axis of drive shaft 3, and each having a radial recess 4a provided circumferentially in a center region thereof. A rotary boss 6 has a pair of pin recesses 6c for accepting with their arcuate surfaces the pins 4. Also, two holding slots 1b are provided in a boss portion 1a of the gear 1 for accommodating the pins 4. A resilient ring 7 has a rectangular shape in cross section, the height being greater than the width, so that an inner edge of ring 7 is neatly fitted into the radial recesses 4a of the pins 4. The other components and their construction are identical to those of Embodiment 1 are denoted by like numerals and will not be explained further.

The operation of the torque controller A of this embodiment is substantially identical to that of Embodiment 1 (FIG. 6).

When the gear 1 is overloaded, it is disengaged from the drive shaft 3 with the pins 4 departing from their respective pin recesses 6c of the rotary boss 6 and made free from torque on the drive shaft 3 (FIG. 7).

What is claimed is:

1. A torque controller comprising:

a drive shaft having an outer surface having therein circumferentially spaced engaging recesses;

a transmission device having a center hole, a boss portion surrounding said center hole, and circumferentially spaced slots extending through said boss portion;

said drive shaft being inserted in said center hole;

engaging elements fitted in respective said slots, each said engaging element comprising a pin-shaped member having an inner portion configured to fit in a respective said engaging recess and an outer portion having therein a radial recess extending in a circumferential direction of said boss portion; and a resilient ring fitted about said boss, said resilient ring having a rectangular cross section including a radial dimension that is greater than an axial dimension, and said resilient ring having a radially inner edge fitting in said radial recess of each said pin-shaped members, said resilient ring urging said pin-shaped members inwardly such that said inner portion of each said pin-shaped member is urged into a respective said engaging recess, thereby enabling transfer of torque from said drive shaft to said transmission device, whereby when said transmission device is overloaded said pin-shaped members can move outwardly of said engaging recesses against the urging force of said resilient ring to terminate transfer of torque from said drive shaft to said transmission device.

2. A torque controller as claimed in claim 1, wherein each said pin-shaped member has an axis extending parallel to an axis of said drive shaft.

3. A torque controller as claimed in claim 1, wherein said drive shaft comprises a rotary boss fitted in said center hole and a motor shaft fitted in said rotary boss.

* * * * *